US009072641B2

(12) United States Patent
Ewing

(10) Patent No.: US 9,072,641 B2
(45) Date of Patent: Jul. 7, 2015

(54) PORTABLE COLLAPSIBLE MOTORIZED MOBILITY DEVICE FOR WHEELCHAIR USERS ADAPTABLE TO REMOVABLY ENGAGE A TRADITIONAL NON MOTORIZED WHEELCHAIR

(71) Applicant: Gregory Ewing, Hollywood, FL (US)

(72) Inventor: Gregory Ewing, Hollywood, FL (US)

( * ) Notice: Subject to any disclaimer, the term of this patent is extended or adjusted under 35 U.S.C. 154(b) by 77 days.

(21) Appl. No.: 14/048,702

(22) Filed: Oct. 8, 2013

(65) Prior Publication Data

US 2015/0096818 A1 Apr. 9, 2015

(51) Int. Cl.
*B62D 55/02* (2006.01)
*A61G 3/08* (2006.01)

(52) U.S. Cl.
CPC .................................... *A61G 3/0808* (2013.01)

(58) Field of Classification Search
CPC .............................. B62D 55/02; A61G 3/0808
USPC ............ 180/9.1, 6.5, 7.1, 7.2, 209, 252, 6.48, 180/21; 280/43.16
See application file for complete search history.

(56) References Cited

U.S. PATENT DOCUMENTS

2008/0011525 A1* 1/2008 Kang et al. .................. 180/9.28
2008/0042490 A1* 2/2008 Abdulaev ...................... 305/120

OTHER PUBLICATIONS

Trade Fair Special, Dialog: the Magazine of Otto Bock Health Care, Sep. 2011 (available at www.ottobock.com).*

* cited by examiner

*Primary Examiner* — Joseph Rocca
*Assistant Examiner* — Jacob Knutson
(74) *Attorney, Agent, or Firm* — Craig Kirsch

(57) ABSTRACT

The present invention relates to the field of motorized mobility devices for wheelchair users, specifically, portable collapsible motorized mobility devices for wheelchair users that removably engage the frame of a traditional wheelchair allowing for the wheelchair user to have a greater degree of autonomy and to negotiate a variety of terrains otherwise inaccessible to them. The present invention includes a collapsible platform operatively connected to a plurality of motorized rolling tracks and a plurality of securing means to secure the user's traditional wheelchair to the device to allow the wheelchair user a greater degree of autonomy.

15 Claims, 4 Drawing Sheets

PORTABLE COLLAPSIBLE MOTORIZED MOBILITY DEVICE FOR WHEELCHAIR USERS ADAPTABLE TO REMOVABLY ENGAGE A TRADITIONAL NON MOTORIZED WHEELCHAIR

CROSS REFERENCE TO RELATED APPLICATIONS (Not Applicable).

STATEMENT REGARDING FEDERALLY SPONSORED RESEARCH OR DEVELOPMENT (Not Applicable).

THE NAMES OF THE PARTIES TO A JOINT RESEARCH AGREEMENT (Not Applicable).

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC (Not Applicable).

BACKGROUND OF THE INVENTION

Field of Invention

The present invention relates to the field of motorized mobility devices for wheelchair users, specifically, collapsible motorized mobility devices for wheelchair users that removably engage the frame of a traditional wheelchair allowing for the wheelchair user to have a greater degree of autonomy and to negotiate a variety of terrains otherwise inaccessible to them.

According to a data from the National Health Interview Survey on Disability (NHIS-D), an estimated 1.6 million (1,600,000) Americans residing outside of institutions use wheelchairs; although other data from the U.S. Census supports a finding that the true number is nearly twice that number. According to NHIS-D, of the 1.6 million American wheelchair users, approximately 1.5 million use manual devices, with only 155,000 people using motorized wheelchairs.

Motorized mobility devices allow for the user to experience autonomy at a level close to that of non-wheelchair users as the motorized mobility device does not require the same amount of effort to move about and therefore be autonomous. Given that ninety percent of American wheelchair users use traditional non-motorized wheelchairs, a very large percentage of American wheelchair users would benefit from a motorized mobility device that was sized and configured to removably engage the frame of a traditional non-motorized wheelchair and thereby transforming it into a motorized wheelchair, and in doing so, allowing for the wheelchair user to have a greater degree of autonomy and to negotiate a variety of terrains otherwise inaccessible to them.

The mass marketplace lacks a collapsible portable motorized mobility device sized and configured to removably engage the frame of a traditional non-motorized wheelchair and thereby transforming it into a motorized wheelchair, and in doing so, allowing for the wheelchair user to have a greater degree of autonomy and to negotiate a variety of terrains otherwise inaccessible to them. Portable motorized mobility devices that currently exist in the market are extremely limited. All previous attempts have sought to expand the user's degree of autonomy by creating a new vehicle, rather than creating an adaptation that can attach to an existing wheelchair. Many wheelchair users are interested in an enhancement that can increase the level of autonomy and mobility of their existing wheelchair to include access to beaches, gravel or loose earth surfaces, without providing for true off road, back woods mobility.

Previous attempts to enhance wheelchair mobility have failed by at least one of the following reasons: (a) the mobility device forces the user to adopt an entirely new vehicle, rather than provide a convenient adaptation that can removably engage with a user's existing wheelchair, (b) the mobility device is appealing only to a small fraction of wheelchair users (e.g. hunters, backwoodsmen, off road enthusiasts, etc.), (c) the mobility device is designed to overcome all obstacles, when for convenience sake, only less challenging terrain needs to be overcome, or (d) the mobility devices have otherwise been impractical by the nature of their size or complexity.

In order to address the void in the current marketplace for portable motorized mobility device sized and configured to removably engage the frame of a traditional non-motorized wheelchair and thereby transforming it into a motorized wheelchair, and in doing so, allowing for the wheelchair user to have a greater degree of autonomy and to negotiate a variety of terrains otherwise inaccessible to them, the inventor has invented the present invention, specifically, a collapsible motorized mobility device for a wheelchair user that removably engages the frame of a traditional wheelchair allowing for the wheelchair user to have a greater degree of autonomy and to negotiate a variety of terrains otherwise inaccessible to them.

An objective of the present invention is to provide a mobility device that allows for a wheelchair user to have a greater degree of autonomy and to negotiate a variety of terrains otherwise inaccessible to them.

Another objective of the present invention is to provide a mobility device that can be selectively adaptable to existing traditional wheelchairs or other mobility devices.

Yet another objective of the present invention is to provide a mobility device that is collapsible and easily portable.

Still another objective of the present invention is to provide a mobility device that appeals to the entire wheelchair using population, Information relevant to attempts to address these objectives can be found in previous attempts to address the foregoing problems specifically U.S. Pat. No. 7,726,446 and U.S. Pat. No. 5,395,129. However, the foregoing reference suffers from one or more of the following disadvantages: the referenced mobility device was designed for specialty use (e.g. hunting) or true off road mobility and the mobility device was designed to overcome all impediments (including stairs, stumps, and gullies).

In light of the above, it would be beneficial to have a collapsible motorized mobility device for wheelchair users that removably engage the frame of a traditional wheelchair allowing for the wheelchair user to have a greater degree of autonomy and to negotiate a variety of terrains otherwise inaccessible to them.

SUMMARY OF THE INVENTION

The present invention is directed to the field of motorized mobility devices for wheelchair users, specifically, collapsible motorized mobility devices for wheelchair users that removably engage the frame of a traditional wheelchair allowing for the wheelchair user to have a greater degree of autonomy and to negotiate a variety of terrains otherwise inaccessible to them.

One embodiment of the present invention can include a collapsible platform with a plurality of motorized rolling tracks or wheels operatively connected thereto, wherein the collapsible platform was sized and configured to removably engage the frame of a traditional wheelchair or other mobility device allowing for the wheelchair user to have a greater degree of autonomy and to negotiate a variety of terrains otherwise inaccessible to them.

Another embodiment of the present invention can include a plurality of selectively engaging ramps sized and configured to correspond to the wheels of a traditional wheelchair.

Another embodiment of the present invention can include a stabilizing means so that the user can negotiate inclined or otherwise non-flat terrains with reduced fear of rolling over.

Another embodiment of the present invention can include a motorized mobility device wherein the mobility device is capable of being operated by a remote control.

Still another embodiment of the present invention might further include a mobility device wherein the motorized rolling tracks are driven by electric motors.

Yet still another embodiment of the present invention might further include a mobility device wherein the batteries used to power the electric motors are rechargeable.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1A:
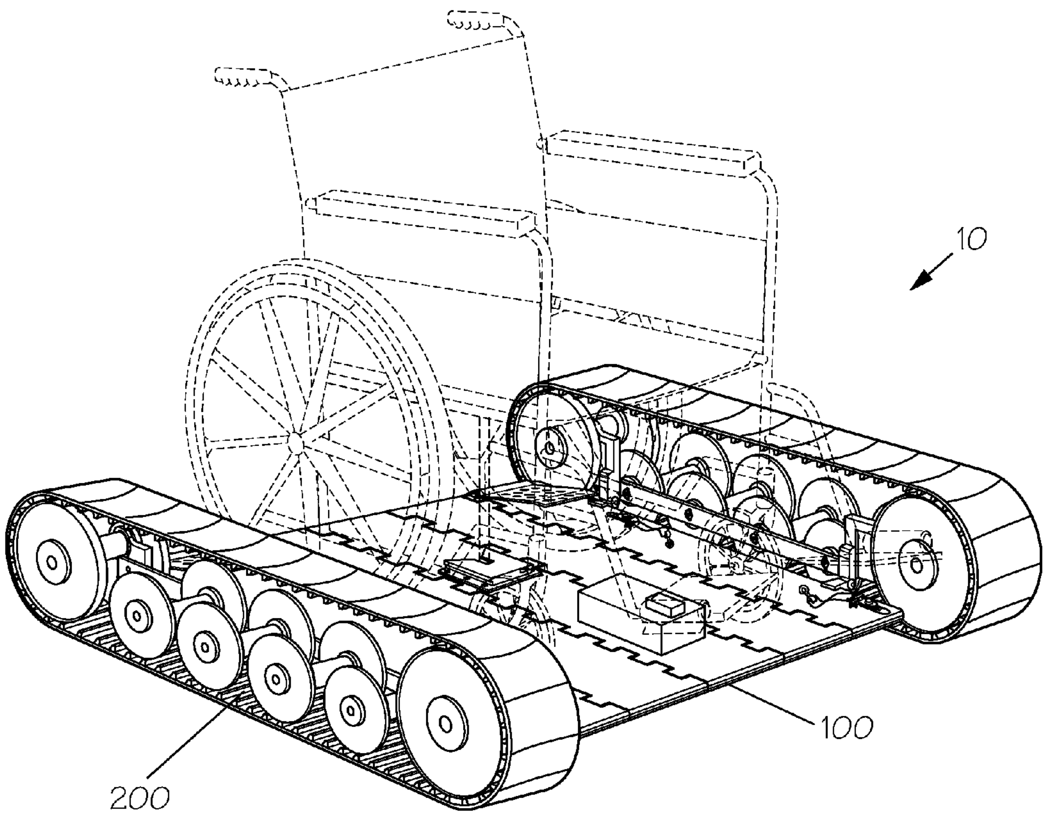
FIG. 1A is a front perspective view of one embodiment of the device with a traditional wheelchair removably engaged therewith, that is useful for understanding the inventive concepts disclosed herein.
Figure 1B:
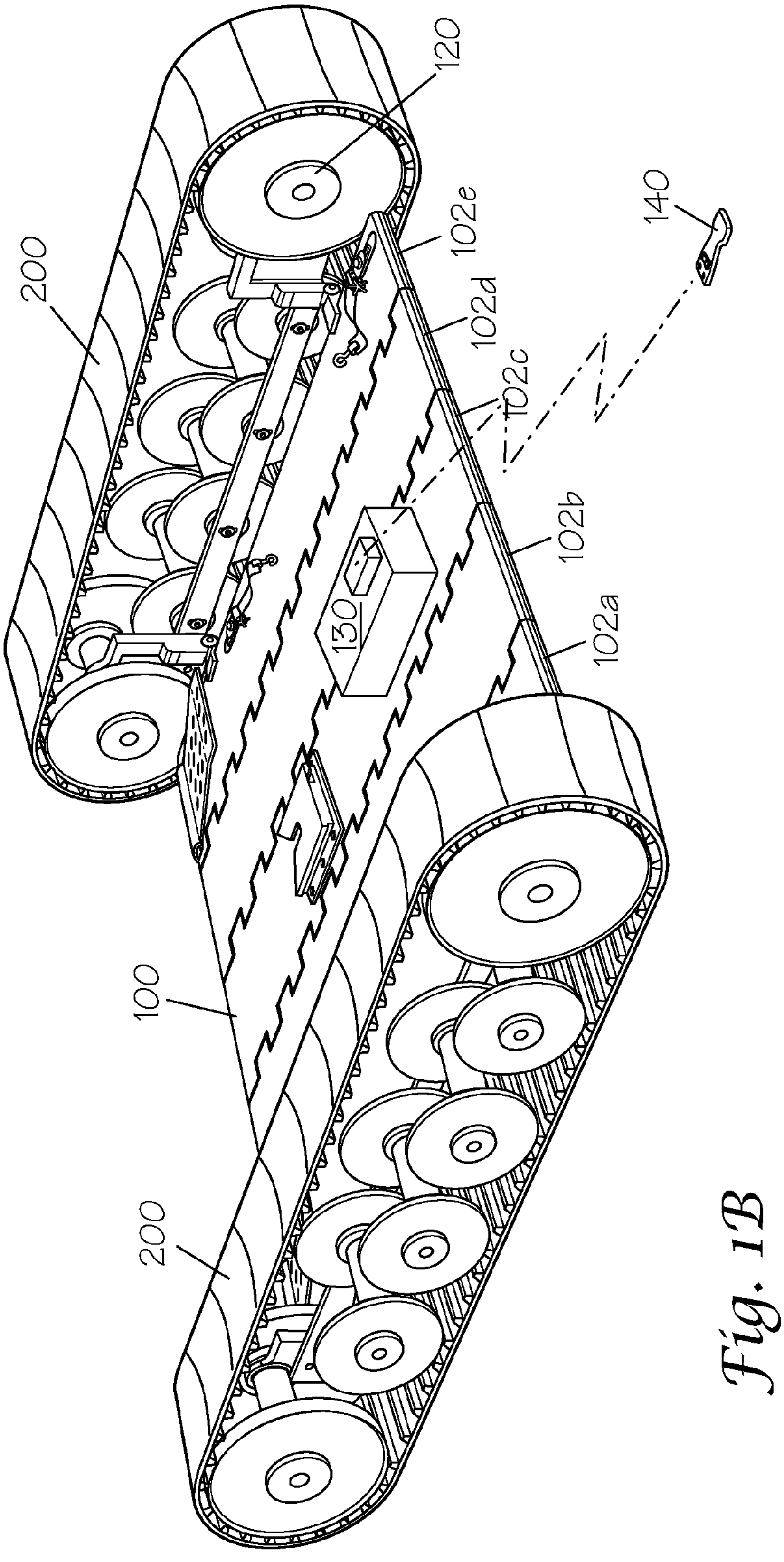
FIG. 1B is a front perspective view of one embodiment of the device, wherein the traditional wheelchair has disengaged therewith.

For purposes of this description, the terms “upper,” “bottom,” “right,” “left,” “front,” “vertical,” “horizontal,” and derivatives thereof shall relate to the invention as oriented in FIGS. 1A-B.

The present invention is directed to the field of motorized mobility devices for wheelchair users, specifically, collapsible motorized mobility devices for wheelchair users that removably engage the frame of a traditional wheelchair allowing for the wheelchair user to have a greater degree of autonomy and to negotiate a variety of terrains otherwise inaccessible to them.

FIGS. 1A and 1B depicting a front perspective view of one embodiment of the device with a traditional wheelchair removably engaged therewith (FIG. 1A) and with the traditional wheelchair disengaged therewith (FIG. 1B), that are useful for understanding the inventive concepts disclosed herein.

Figure 3:
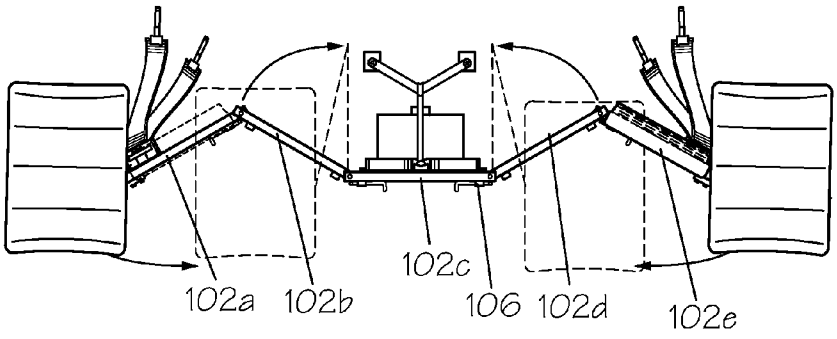
FIG. 3 is a rear plan view of one embodiment of the device in partially collapsed position.

As shown, the device 10, according to one embodiment, might include a collapsible platform 100. It is envisioned that the collapsible platform 100 might further comprise of five panels 102*a-e* operatively attached to each other, sized and configured such that the collapsible platform 100 can alternate between a first, compacted position and a second, extended position. FIG. 3 illustrates one embodiment of the current invention in partially collapsed position in mid transition from the first, compacted position to the second, extended position. It is further envisioned that the collapsible platform 100 might further include a plurality of selectively engageable locking mechanisms 106 to secure the collapsible platform 100 in the second, extended position, once it is transitioned from the first, compacted position, used primarily for storage or easier transportation. It is envisioned that the plurality of selectively engageable locking mechanisms 106 might be in the form of a slide bolt and bolt receiver configuration, although one skilled in the art would appreciate that any number securing mechanisms and configurations could also be used.

It is envisioned that the five panels 102*a-e* operatively attached to each other might be operatively attached to each other in a hingedly attached configuration or a slidably engageable configuration although other configurations are also contemplated. While the exact dimensions of the collapsible platform 100 are not critical, it is important that the collapsible platform 100 is large enough and strong enough to accommodate a tradition wheelchair and user.

It is also envisioned that one embodiment of the present invention might further comprise of a plurality of selectively engaging ramps 104*a-b* sized and configured to correspond to the wheels of mobility device that is to be used with the present invention. In one embodiment it is envisioned that the plurality of selectively engaging ramps 104*a-b* might be hingedly attached to the collapsible platform 100 such that each selectively engaging ramp 104*a-b* can pivot from a first, down position where each selectively engaging ramp 104*a-b* is in direct contact with the ground to a second, up position where each selectively engaging ramp 104*a-b* is raised and no longer in direct contact with the ground, See FIG. 2. While the exact dimensions of the selectively engaging ramps 104*a-b* are not critical, it is important that the selectively engaging ramps 104*a-b* are configured such that the wheels of a traditional wheelchair or other mobility device line up with and are supported by the selectively engaging ramps 104*a-b* such that a wheelchair user can position the wheelchair on the device 10 by rolling up the selectively engaging ramps 104*a-b* when the selectively engaging ramps 104*a-b* are in the first, down position and the selectively engaging ramps 104*a-b* are in direct contact with the ground.

It is envisioned that the device 10 might further include a stabilizing means (not pictured) that is operatively connected to the collapsible platform 100 and sized and configured such that the end of the stabilizing means that is not connected to the collapsible platform 100 would contact the ground when the device is inclined or otherwise at risk of rolling over. When the stabilizing means is in direct contact with the ground, the device 10 would be stabilized and therefore the user would be able to negotiate inclined or otherwise non-flat terrain without fear or at least with a reduced fear of rolling over.

Figure 4:
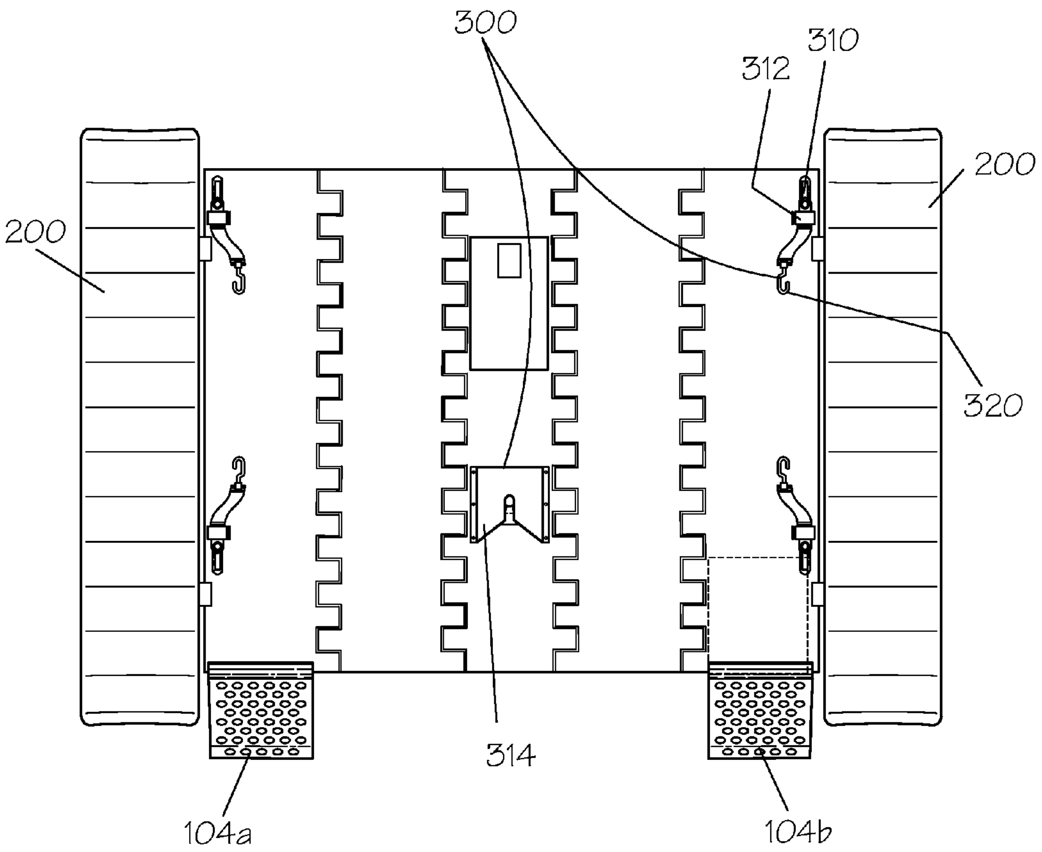
FIG. 4 is a top plan view of one embodiment of the device with both selectively engaging ramps in the down “engaged” position.

As described herein, the collapsible platform 10 might be composed of a durable, strong, weather and scratch resistant material such as a light weight metal, carbon fiber, or plastic material or other materials with similar characteristics that are known in the art. It is envisioned that the collapsible platform 10 might be substantially rectangular in shape, approximately 48"W×42"L when in its expanded position, see FIG. 4; however, any number of shapes and dimensions are also contemplated. Of course the materials are not limited to those mentioned in this application and it is contemplated that any number of materials with similar characteristics may be used as well.

As seen in FIGS. 1-4, the device 10 also includes a plurality of motorized rolling tracks 200 operatively connected to the collapsible platform 100. In one embodiment, the plurality of motorized rolling tracks 200 might be hingedly attached to the collapsible platform 100 so that the device 10 can be more easily stored when the device 10 is in the compacted configuration, see FIG. 3. The exact dimensions and specifications of the plurality of motorized rolling tracks 200 are not critical and it is envisioned that the motorized rolling tracks may include a variety of sizes and configurations of rollers and track lengths depending on the terrain the device 10 will be used. It is further envisioned that the tracks on the plurality of motorized rolling tracks 200 might include a variety of gripping means used to better negotiate varieties of terrains that the user may encounter. In one embodiment of the device 10, it is envisioned that the plurality of motorized rolling tracks 200 might be interchangeable such that the user can interchange the plurality of motorized rolling tracks 200 on the user's device 10 in accordance to the size, quantity, and configuration of the rollers and track lengths and gripping means used in connection therewith a particular terrain may require.

Regarding the mobility of the device, it is envisioned that the device 10 might further comprise of at least one electric motor 120 to drive the motorized rolling tracks 200. It is further envisioned that the at least one electric motor 120 of the device 10 might be powered by at least one battery 130. In certain embodiments of the invention, the at least one battery 130 might be rechargeable. It is contemplated that one embodiment of the device 10 might further include a battery charger (not pictured) to recharge the at least one battery 130 while the user is using the device 10. While the exact specifications of the electric motor 120 and the battery 130 are not critical, it is important to note that the electric motor 120 must be strong enough to drive the motorized rolling tracks 200 around a variety of terrains and various degrees of incline and the battery 130 must provide enough electricity in order to do so.

In one embodiment of the device 10, it is envisioned that the device 10 might further include a remote control 140 that remotely controls the mobility module of the device 10 so that the device 10 can be maneuvered remotely by a third party or by the user using the remote control 140.

As described herein the mobility module of the device 10, comprising the at least one electric motor 120, the at least one battery 130, and the remote control 140 are in electronic communication with each other using hard wired circuitry or wireless electronic communication means that are known in the art. One skilled in the art would recognize that this can be achieved through a variety of methods including both parallel and series wiring for the hard wiring and wireless technologies for the remotely controlled portions.

In order to ensure that the user's traditional wheelchair is securely engaged to the device 10, it is envisioned that the collapsible platform 100 might further include a plurality of securing means 300 for selectively engaging the frame of a traditional wheelchair with the collapsible platform 100. It is further envisioned that the plurality of securing means 300 might include belt 310 and hook 320 combinations. In certain embodiments, the belt 310 might further include a ratcheting tightening system 312. It is also envisioned that the plurality of securing means 300 might also include tongue and grove securing system 314. While it is likely that each device 10 may employ only a single securing means 300, it is also contemplated that that a device 10 may employ either a belt 310 and hook 320 combination or a tongue and grove securing system 314, or any combination thereof, or other securing means 300 that are known in the art. Any number of securing means 300 may be utilized and the list of possible securing means 300 is meant to be exemplary and not limiting.

Both the belt 310 and hook 320 combinations as well as the tongue and groove securing system 314 are known in the art as means for securely fastening a traditional wheelchair to a known, stand-alone object. While the exact dimensions and specifications of the plurality of securing means 300 are not critical, it is important to note that the securing means must be sized and configured to secure a traditional wheelchair onto the collapsible platform 100. As described herein, the tongue and groove securing system 314, the hooks 320, and the ratcheting tightening system 312, of the plurality of securing means 300 might be composed of hard plastic or metal alloys and the belts 310 might be composed of synthetic material such as nylon. Of course, the materials are not limited to those mentioned in this application and it is contemplated that any number of materials with similar characteristics may be used as well.

In operation, as seen in FIG. 1A and FIG. 5 the device 10 is used in combination with a traditional wheelchair. When the wheelchair user of the device 10 desires to increase the degree of autonomy and to negotiate a variety of terrains otherwise inaccessible to them in a traditional wheelchair the user must first prepare the device 10 or otherwise have the device 10 prepared for them. When the device 10 is in its compacted position, as seen in FIG. 3, preparing the device involves transitioning the collapsible platform 100 of the device 10 into its second, extended position as seen in FIG. 3.

Once the collapsible platform 100 is in its second, extended position, the plurality of selectively engageable locking mechanisms 106 are selectively engaged to secure the device 10 in its second, extended position.

Before the user can mount the device 10, the plurality of selectively engaging ramps 104*a-b* sized and configured to correspond to the wheels of a traditional wheelchair must be in their first, down position where each selectively engaging ramp 104*a-b* is in direct contact with the ground. With each selectively engaging ramp 104*a-b* is in direct contact with the ground, the user can align the wheels of their traditional, wheelchair with the selectively engaging ramp 104*a-b* is in direct contact with the ground and the user can roll up the selectively engaging ramp 104*a-b* and onto the collapsible platform 100 of the device 10.

Figure 2:
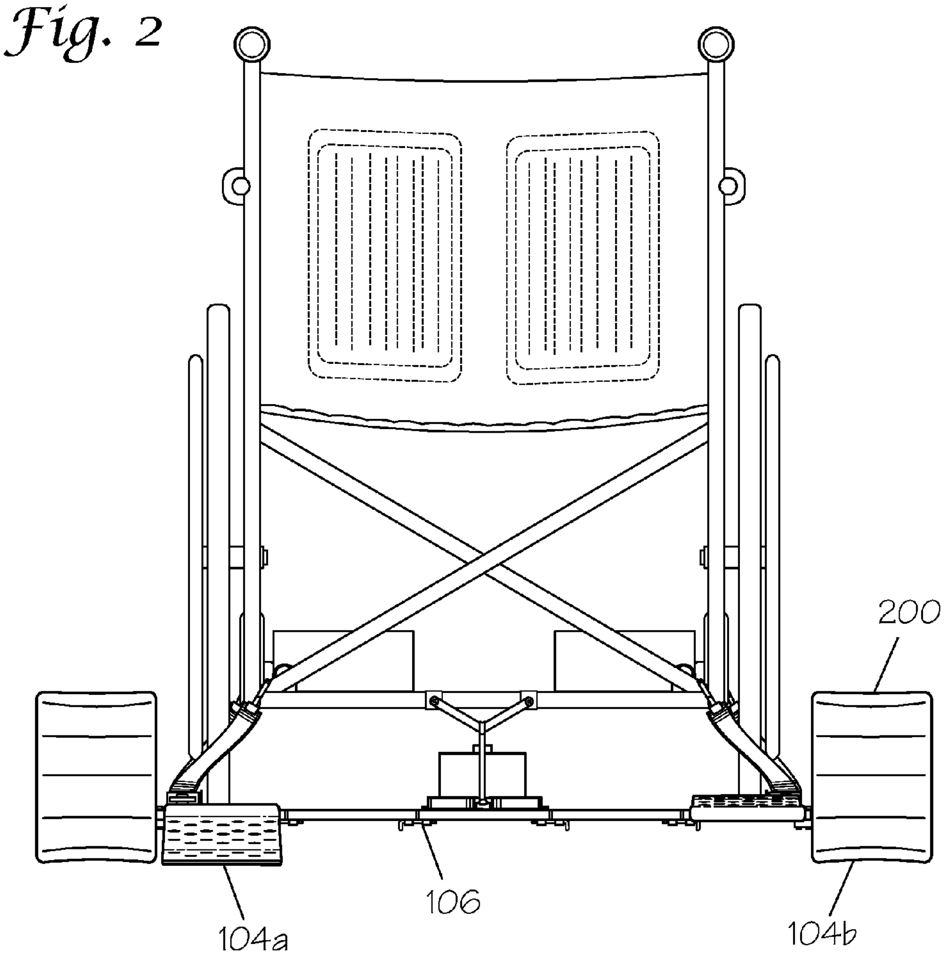
FIG. 2 is a back plan view of one embodiment of the device with one of the selectively engaging ramps in a down “engaged” position and the other selectively engaging ramp in an up “disengaged” position.

Once the user is properly situated on the collapsible platform 100 of the device 10, the user can transition the selectively engaging ramps 104*a-b* from the first, down position where each selectively engaging ramp 104*a-b* is in direct contact with the ground to a second, up position where each selectively engaging ramp 104*a-b* is raised and no longer in direct contact with the ground, See FIG. 2 and the user can begin to secure their traditional wheelchair to the device 10, using the plurality of securing means 300.

In one embodiment, the user, when rolling up the selectively engaging ramps 104*a-b*, will align a tongue located on the under carriage of the user's traditional wheelchair with a receiving port of the tongue and groove securing system 314 fixedly attached to the collapsible platform 100 of the device 10. Once the tongue and groove system 314 is engaged, the user may begin to further secure the frame of their traditional wheelchair with the device using the belt 310 and hook 320 combinations.

Once the belt 310 and hook 320 combinations are secure and the ratcheting tightening system 312 has reduced the slack in the belt 310 securing the frame of the wheelchair to the device, the user can operate the device using the remote control 140. It is envisioned that the remote control 140 might include directional and speed controls for the device 10.

Using the remote control 140, the wheelchair user can control the speed and direction of the plurality of motorized rolling tracks 200 and therefore have a greater degree of autonomy and negotiate a variety of terrains otherwise inaccessible to them without the use of the device 10.

Once the user no longer wishes to use the device 10, they simply disengages the plurality of the securing means 300, transitions the plurality of selectively engaging ramps 104*a-b* from the second, up position where each selectively engaging ramp 104*a-b* is raised and no longer in direct contact with the ground to the first, down position where each selectively engaging ramp 104*a-b* is in direct contact with the ground again, and rolls down the selectively engaging ramp 104*a-b* in direct contact with the ground, to the ground.

The selectively engageable locking mechanisms 106 are then selectively dis-engaged to allow for the device 10 to transition from its second, extended position to its first compacted position to allow for easy storage and transportation of the device 10. It is envisioned that one embodiment of the device 10 may allow for the user of the device 10 to remotely maneuver the device 10 when the device 10 in its collapsed position to allow for easy storage of the device 10.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A collapsible motorized mobility device for wheelchair users or other mobility device users that removably engages a frame of a traditional wheelchair or mobility device allowing for the user to have a greater degree of autonomy and to negotiate a variety of terrains otherwise inaccessible to them, said device comprising:

- a collapsible platform, the collapsible platform further comprises five panels operatively attached to each other sized and configured such that the collapsible platform can alternate between a first, compacted position and a second, extended position;
- a plurality of motorized rolling tracks operatively connected to the collapsible platform; and
- a plurality of securing means for selectively engaging the frame of the traditional wheelchair or other mobility device with the collapsible platform.

2. The device of claim 1 further comprising a plurality of selectively engaging ramps sized and configured to correspond to wheels of the traditional wheelchair or other mobility device.

3. The device of claim 1 further comprising a stabilizing means so that the user can negotiate inclined or otherwise non-flat terrains with reduced fear of rolling over.

4. The device of claim 1 wherein the collapsible motorized mobility device is capable of being operated by a remote control.

5. The device of claim 1 wherein the motorized rolling tracks are driven by at least one electric motor.

6. The device of claim 4 wherein the at least one electric motor are powered by rechargeable batteries.

7. The device of claim 5 wherein the device further comprises of a battery charger sized and configured to recharge the rechargeable batteries used to drive the motorized rolling tracks.

8. The device of claim 1 wherein the plurality of securing means includes belt and hook combinations.

9. The device of claim 1 wherein the plurality of securing means includes belts with ratcheting tightening systems.

10. The device of claim 1 wherein the plurality of securing means includes tongue and groove securing systems.

11. The device of claim 1 wherein the device is composed of a light weight metal.

12. The device of claim 1 wherein the device is composed of a light weight carbon fiber.

13. The device of claim 1 wherein the device is composed of a plastic.

14. The device of claim 1 wherein the collapsible platform further comprises a plurality of selectively engageable locking mechanisms secure the platform when the platform is in the second extended position.

15. The device of claim 1 wherein the device can be remotely controlled and maneuvered regardless of whether the device is in the extended position or the compacted position.

* * * * *